United States Patent Office 3,706,787
Patented Dec. 19, 1972

3,706,787
ALKYL ESTERS OF FLUOROALKYL
DICARBOXYLIC ACIDS
Robert Bonner Hager, Collegeville, Pa., assignor to Pennwalt Corporation, Philadelphia, Pa.
No Drawing. Continuation-in-part of application Ser. No. 839,077, July 3, 1969, which is a continuation-in-part of application Ser. No. 651,967, July 10, 1967, now Patent No. 3,471,518. This application July 7, 1971, Ser. No. 160,572
Int. Cl. C07c 149/20
U.S. Cl. 260—481 R         3 Claims

ABSTRACT OF THE DISCLOSURE

Alkyl esters of perfluoroalkyl alkylene thiocarboxylic acids are disclosed wherein the acids are represented by the structures:

(I) 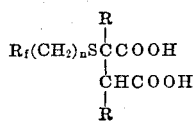

(II) 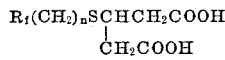

(III) 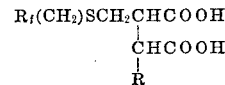

where $R_f$ is perfluoroalkyl, $n=1-3$, and R is H, $CH_3$, or $C_2H_5$, and where in Formula I at least one R is H. The esters are readily converted to the acids which are useful for imparting oil and water repellency to leather.

---

This application is a continuation-in-part of application Ser. No. 839,077, filed July 3, 1969, now abandoned, which in turn is a continuation-in-part of Ser. No. 651,967, filed July 10, 1967, now U.S. 3,471,518.

This invention relates to alkyl esters of fluoroalkyl thiodicarboxylic acids and more particularly to alkyl esters of perfluoroalkyl alkylene thiodicarboxylic acids wherein the dicarboxylic moiety is comprised of a 4 or 5 carbon member linear chain, said acid represented by the formulae:

(I) 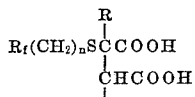

(II) 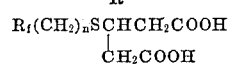

(III) 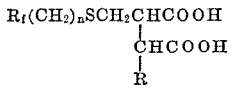

where $R_f$ is a straight or branched chain perfluoroalkyl radical having 5 to 13 carbon atoms, $n$ is an integer of 1 to 3, and R is selected from the group consisting of of hydrogen, methyl, and ethyl, with the provision that in Formula I at least one R is hydrogen, the alkyl moiety of said esters having from one to twenty carbon atoms. By the term alkyl ester as used herein is meant both the dialkyl ester of the acid and the monoalkyl ester (i.e., partial ester) of said acid in which a single —COOH group thereof is esterified.

The ester of this invention is prepared by reacting a mercaptan of the formula $R_f(CH_2)_nSH$, $R_f$ and $n$ having been defined above, with a dialkyl ester or monoalkyl ester of an alpha-beta ethylenically unsaturated, aliphatic hydrocarbon dicarboxylic acid having 4 to 5 carbon atoms in the dicarboxylic moiety; such unsaturated acids include, for example, maleic, fumaric, citraconic, mesaconic, glutaconic, itaconic, ethyl maleic, methyl itaconic and the like. The term "alkyl" as used herein has its conventional connotation, e.g., methyl, ethyl, n-propyl, isopropyl, n-butyl, isobutyl, sec-butyl, and pentyl, hexyl, heptyl, octyl, nonyl, decyl, undecyl, dodecyl, tridecyl, tetradecyl, pentadecyl, hexadecyl, heptadecyl, octadecyl, nonadecyl and eicosanyl, also including the branched chair isomers of the longer chain alkyl groups.

The starting mercaptan reactant, $R_f(CH_2)_nSH$, may be obtained according to the methods described by N. O. Brace, U.S. 3,172,910, and W. S. Friedlander, U.S. 3,088,849. The reaction between the mercaptan and the alkyl ester of the hydrocarbon dicarboxylic acid to prepare the ester of this invention is carried out by bringing the reactants together in substantially stoichiometric amounts in aqueous ethanol solution in the presence of small amounts of sodium hydroxide at from about 0° C. to about 80° C.

An alternative method for preparing the lower alkyl esters embodied in this invention is to first prepare the perfluoroalkyl alkylene thiodicarboxylic acid, represented by the foregoing Formulae I, II and III, or the corresponding acid chloride, and then to completely or partially esterify said acid or acid chloride. The preparation of the perfluoroalkyl alkylene thiodicarboxylic acid is conveniently carried out by reacting the fluoroalkyl mercaptan and the unsaturated hydrocarbon dicarboxylic acid in substantially stoichiometric amounts in aqueous ethanol solution in the presence of small amounts of sodium hydroxide and a tertiary amine, such as piperidine, at from about 0° C. to 80° C. The product is recovered by evaporating the ethanol, neutralizing the caustic with aqueous HCl and extracting the product from the aqueous solution with diethyl ether, followed by evaporation of the ether. The acid chloride is prepared by treating the corresponding acid precursor with an excess of phosphorus pentachloride or thionyl chloride, according to the exemplary reaction.

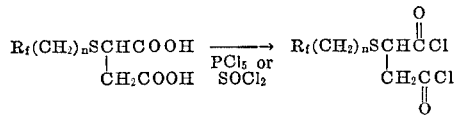

The alkyl ester of this invention is obtained by esterifying the fluoroalkyl alkylene thiodicarboxylic acid (or acid chloride) with an alkanol by means well known to the organic chemist, via the exemplary reaction:

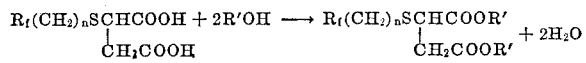

where R' is alkyl. When one equivalent of the alkanol is employed, the monoalkyl ester of the acid is alternatively prepared with the elimination of one mole water.

The lower alkyl esters embodied herein are valuable intermediates for the preparation of resins and varnishes such as alkyds, allylics, polyesters, and polyamides, etc., by transesterification reaction or displacement of the alkyl moiety or moieties. The long chain alkyl esters are valuable synergists for polypropylene antioxidants, being somewhat better than the shorter chain alkyl esters for this purpose.

When converted to the acid derivatives by simple hydrolysis, the compounds of this invention are useful for imparting to leather goods resistance to oil and water. The acids are colorless and therefore are especially useful in treating white or light-colored leathers for which treatment with the intensely colored, green, chromium complexes of fluorocarboxylic acids, widely used for leather treatment, is not possible.

J. F. Harris, U.S. 3,522,293, July 28, 1970, discloses the ultraviolet light initiated reaction of trifluoromethanethiol with a lower alkyl acrylate to produce $$CF_3SCH_2CH_2COOR$$

and as an unwanted by-product the 2:1 adduct

where R is lower alkyl, such compounds being described as useful as soil fungicides, nematocides and insecticides. As this latter Harris compound is obtained by a different technique from the method of the present invention, involving reaction of trifluoromethyl mercaptan containing no methylene or polymethylene linkages $-(CH_2)_n-$ with an acrylate ester (an ester of a monobasic acid), in contrast to the present reaction of a long chain fluoroalkyl hydrocarbon mercaptan with the alkyl ester of a dicarboxylic acid, the structure of the Harris compound is quite different and non-homologous relative to the present compounds, with regard to the spatial relationship of the fluoroalkyl group, the sulfur atom and the hydrocarbon moieties thereof. Moreover, the short chained Harris compound is not suited for the oil and water-repellent applications for which the present compounds are adapted, a perfluoroalkyl terminal group of at least about 5 carbon atoms being necessary to provide oleophobic and hydrophobic properties to leather treating compositions produced therefrom.

The examples that follow are provided to illustrate and clarify the invention but not to limit in any way its scope as defined by the appended claims.

EXAMPLE I

Preparation of

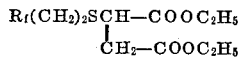

A 250 ml. flask equipped with addition funnel and magnetic stirrer was charged with 50 ml. of ethanol, 0.15 g. of Na, and 53 g. (0.1 mole) of $C_9F_{19}C_2H_4SH$. Diethyl maleate, 17.3 g. (0.1 mole) was added dropwise from the addition funnel while maintaining the reaction temperature below 40° C. The reaction mixture was allowed to stand overnight and then swamped with water. The lower layer was collected, washed with three 25 ml. portions of water and dried over Drierite." Vacuum fractionation gave 51.5 g. (71%) of the diester, B.P. 137° C./0.1 mm. Hg, as a colorless liquid. The infrared spectrum showed a single C=O band at 1750 cm.$^{-1}$.

A 2.5 g. sample of this diester was added with stirring to a warm solution of 1.9 g. of KOH in 3.7 g. of $H_2O$, and the reaction mixture refluxed. After cooling, the mixture was acidified with 12 N HCl, washed with 1,1,2-trichlorotrifluoroethane, and extracted with ether. Evaporation of the ether gave the diacid, 0.45 g., M.P. 138–142° C., having the structure

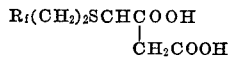

Pig suede leather was treated with the compounds derived from the esters of this invention and the results of the degree of oil and water repellency obtained therewith were compared with the results of treatment with a commercially available leather treating agent, the chromium complex of a highly fluorinated organic acid.

The above-prepared dicarboxylic acid derived from the ester of the invention was applied to the pig suede leather from an aqueous emulsion of 1 to 5% acid, 10% tetrahydrofuran alcohol, and 40% water based on drained weight of leather (65% moisture) using a model tanning wheel and drumming for 45 minutes at 120° F. The skins were pasted and dried 5 hours at 150° F. and then staked and dry milled. The chromium complex-treated skins were processed in the same wheel using a medium float at 100° F., and a 45 minute drumming. These skins were horsed for 6 hours and then pasted and treated as above.

The following table lists the compounds tested:

| Sample | Compound | Percent load of compound on leather |
|---|---|---|
| 1 | None (control) | -- |
| 2 | Chromium complex of highly fluorinated organic acid ("Leather Chemical FC-146"), 30% solids. | 5 |
| 3 | $R_f(CH_2)_2SCH(CH_2COOH)COOH$ | 5 |
| 4 | Same as above | 3 |
| 5 | do | 2 |
| 6 | do | 1 |

The evaluations of the treated leathers were made using test methods described in a bulletin published by the Minnesota Mining and Manufacturing Company, May 1, 1960, "3M Brand Leather Chemical FC–146," except for the water repellency spray rating which was determined according to AATCC Standard Test Method 22–1952. In all, the following tests were made: water repellency by measuring "percent absorbed water" (low value is desirable) and "spray rating" (high value is desirable); oil repellency by measuring "percent absorbed oil" (low value is desirable) and surface oil rating (high value is desirable); chemical resistance by "caustic burn" test and "acid curl" test. The results are tabulated in the following table:

| Sample number | Percent absorbed $H_2O$ | Spray rating | Percent absorbed oil | Surface oil rating | NaOH burn | Acid curl, degrees |
|---|---|---|---|---|---|---|
| 1 | 90–100 | 0 | 80–100 | 0 | Severe | 90 |
| 2 | 66 | 50 | 58 | 50 | Stain | 0 |
| 3 | 54 | 70 | 11 | 80 | None | 0 |
| 4 | 57 | 80 | 49 | 50 | do | 0 |
| 5 | 56 | 80 | 56 | 50 | do | 0 |
| 6 | 65 | 80 | 57 | 50 | do | 0 |

The above results demonstrate the marked superiority of the colorless compounds of this invention as leather treating agents compared to the green-colored chromium complex materials.

EXAMPLE II

Preparation of

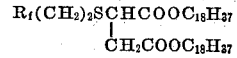

To a warm solution of 5.4 g. of octadecanol in 75 ml. of 1,1,2-trichlorotrifluoroethane was added 4 g. of triethylamine followed by dropwise addition of 6.83 g. of the diacid chloride

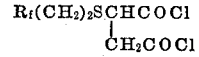

in 25 ml. of 1,1,2-trichlorotrifluoroethane. The mixture was refluxed for 6 hours, then filtered and diluted with 500 ml. of ether. This solution was washed with water, 5% HCl, 5% $NaHCO_3$-0.5% NaOH, water, and then dried over $CaSO_4$, charcoaled, and evaporated to dryness in a steam bath to give 8.3 g. of waxy solid, M.P. 46–48° C., having a satisfactory IR spectrum.

Calculated for $C_{51}H_{81}F_{19}O_4S$ (percent): C, 53.2; H, 7.09; S, 2.79. Found (percent): C, 53.7; H, 7.34; S, 3.01.

Appropriate quantities of the commercial phenolic antioxidant "Irganox 1010" (Geigy Chemical Corporation) and the above-prepared diester were blended into Hercules "Pro-Fax 6501" unstabilized polypropylene using a one-quart cone on a Patterson-Kelly Twin Shell Dry Blender.

The polymer blend was extruded into ⅛" rods with a Killion 1" diameter screw type extruder at 410–480° F., chopped into pellets with a Wiley mill and hot pressed at 200–225° C. into 10 mil sheets.

Three 1" x 4" x 10 mil samples were stamped from the above sheets and suspended from a rotating disk in a forced air circulating oven maintained at 150° C.

The average hours to initial embrittlement were determined for the set of three samples.

| | Hours |
|---|---|
| Irganox 1010 (0.1 wt. percent of polymer) | 128 |
| Irganox 1010+ester (0.1 wt. percent of each) | 306 |

The data shows the representative ester to be active as an auxiliary stabilizer for conventional phenolic antioxidants in polypropylene resins. The shorter chain diester prepared in Example I was substituted for the long chain diester in the above test. The synergistic combination gave 230 hours of protection from embrittlement.

I claim:
1. A compound selected from the group consisting of a dialkyl ester and a monoalkyl ester of a perfluoroalkyl alkylene thiodicarboxylic acid wherein the dicarboxylic moiety is comprised of a 4 or 5 carbon member linear chain, said acid represented by a structure selected from the group consisting of

(I) 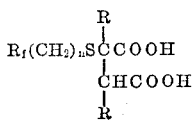

(II) 

(III) 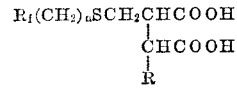

where $R_f$ is a straight or branched chain perfluoroalkyl radical having 5 to 13 carbon atoms, $n$ is an integer of 1 to 3, R is selected from the group consisting of hydrogen, methyl and ethyl with the provision that in structure (I) at least one R is hydrogen, the alkyl portion of the ester having from one to twenty carbon atoms.

2. An ester according to claim 1 wherein each R is hydrogen.

3. A compound according to claim 1 wherein the alkyl portion of the ester is lower alkyl.

References Cited

UNITED STATES PATENTS

| | | | |
|---|---|---|---|
| 2,581,514 | 1/1952 | Chilcote | 260—481 R |
| 2,700,671 | 1/1955 | Hafliger | 260—481 R |
| 2,892,853 | 1/1959 | Koenig | 260—481 R |
| 3,247,109 | 4/1966 | Benoit | 260—481 R |
| 3,522,283 | 7/1970 | Harris | 260—481 R |

OTHER REFERENCES

Geigy, C. A., 64 14097h (1966).

LORRAINE A. WEINBERGER, Primary Examiner

J. F. TERAPANE, Assistant Examiner

U.S. Cl. X.R.

252—407

PO-1050
(5/69)

UNITED STATES PATENT OFFICE
CERTIFICATE OF CORRECTION

Patent No. 3,706,787            Dated    December 19, 1972

Inventor(s) Robert Bonner Hager

It is certified that error appears in the above-identified patent and that said Letters Patent are hereby corrected as shown below:

Column 1, line 26, beginning of Formula III should read -- $R_f(CH_2)_n$

Column 1, line 61, delete one "of" after "consisting" and before "hydro-"

Column 2, line 10 - "chair" should read -- chain --.

Column 5, line 26, in Formula II "CCOH" should read --COOH--.

Signed and sealed this 1st day of May 1973.

(SEAL)
Attest:

EDWARD M. FLETCHER, JR.          ROBERT GOTTSCHALK
Attesting Officer                   Commissioner of Patents